United States Patent [19]

Subbaraman et al.

[11] Patent Number: 5,710,195

[45] Date of Patent: Jan. 20, 1998

[54] NON-PIGMENTED OPAQUE JET INK COMPOSITIONS AND METHODS OF CREATING OPAQUE INDICIA

[76] Inventors: Ramesh B. Subbaraman, 207 N. Acacia, Apt. D, Fullerton, Calif. 92631; Barry R. Brucker, 805 N. Roxbury St., Beverly Hills, Calif. 90210

[21] Appl. No.: 286,634

[22] Filed: Aug. 5, 1994

[51] Int. Cl.[6] .................................. C08L 1/02; C08L 1/28
[52] U.S. Cl. ........................... 524/31; 524/35; 524/44; 524/46
[58] Field of Search ........................ 524/35, 44, 46, 524/376, 379, 297, 299, 296, 141, 247, 114, 394, 31; 106/20 D, 20 R

[56] References Cited

U.S. PATENT DOCUMENTS

| | | | |
|---|---|---|---|
| 4,207,577 | 6/1980 | Mansukhani | 346/1.75 |
| 4,290,072 | 9/1981 | Mansukhani | 346/1.1 |
| 4,352,901 | 10/1982 | Maxwell | 524/38 |
| 4,983,664 | 1/1991 | Truskolaski et al. | 524/514 |

OTHER PUBLICATIONS

Jerome A Selner, "Microvoids as Pigments", 1978 Ind. Eng. Chem. Prod. Rev., vol. 17 No. 4.

*Primary Examiner*—Peter A. Szekely
*Attorney, Agent, or Firm*—Fischbach, Perlstein, Lieberman & Yanny

[57] ABSTRACT

This invention applies to methods for creating opaque indicia on substrate surfaces and to non-pigmented, moisture-free, jet ink compositions containing only solvents and solvent soluble resins and dyes that exhibit the acceptable characteristics of opacity, contrast, adhesion and machine compatibility. The compositions are on weight percentage basis as stated below. The compositions contain a combination of film forming resins of varying molecular weights of a dry resin solids percentage between 8 and 15%. The resins are chosen from the following: nitrates of cellulose; acrylics; alkyds; vinyl acetate-vinyl chloride copolymers; and styrene acrylic. The quantities of resin are chosen according to the desired viscosity, adhesion strength of film on the subject substrate and the degree of shearing of the drying resin mixture. An optimum balance of adhesion and opacity is stoichiometrically obtained. The differential solubilities of the resins in the solvent-blend is the prime moving factor of the opacifying action. The use of acid dyes and basic salts that exhibit fluorescence is considered and used in the formulations to enhance the visibility and contrast of the resultant opacified dried state of resin solids on the substrate surface. The use of specific plasticizers are another feature of this invention. Plasticizers are used in the ink jet composition to increase the flowability of the composition and also increase the tensile strength and adhesion of the ink to the substrate to which it is applied. The principle of this invention is that a water-free, multi-solvent and multi-resin jet ink which characteristically forms micro laminate miscelli and plasticizers is found to have good adhesion and opacity, and can be used to mark code and indicate non-absorbent dark substrates.

28 Claims, No Drawings

NON-PIGMENTED OPAQUE JET INK COMPOSITIONS AND METHODS OF CREATING OPAQUE INDICIA

BACKGROUND OF THE INVENTION

1. Field of the Invention

The present invention is directed to methods for creating opaque indicia on substrate surfaces through the use of clear, stable, moisture-free, non-pigmented jet ink formulations that dry hard, opaque, and with varying colors to be marked on non-absorbent dark or other surfaces. These ink formulations are designed to operate in the high-speed continuous ink jet and Drop-on-demand marking machines. The mechanism of opacification and adhesion is believed to be as follows:

This water-free ink basically consists of a combination of intra-compatible, solvent-soluble resins and a blend of solvents and co-solvents which are proportioned according to rates of evaporation. The intermediate portion of resin strata shears between a slow evaporating and a fast evaporating solvent thereby forming a multitude of micro laminate miscelli that are dry but inter-linked. The micro laminate miscelli are embedded on a plasticized film-forming layer that adheres to the substrate. The micro laminate miscelli scatter incident light efficiently aided by fluorescent acid dye coloration thereby creating an opaque image.

2. Description of the Prior Art

Currently there exists a great number of solvent based transparent jet inks that have been patented. These 'transparent' colored inks (all colors including black) tend only to coat the surface and only contrast when the surface of the substrate is of a lighter color than the ink. When the substrate is of a darker color, the transparent ink coat only shows the color of the surface and does not contrast it. There are also a great number of solvent based pigment loaded jet inks for marking and indicating with opaque characters. These inks are being used widely with a great degree of adhesion and opacity, but there is however an in-built disadvantage of pigments settling in the reservoir and fine passages of the printing machine's parts. The ink reservoir has to be in a constant state of turbulence in order to keep the ink consistent in ingredients and properties. The velocity of the ink, throughout the entire circuit of fine tubes and parts, should be maintained above the residual settling velocity. This is not guaranteed when the passage expands and contracts and eddies are formed. These eddies, where a velocity gradient is experienced, are points of particle sedimentation and build-up. Therefore, avoidance of such vulnerable points becomes a necessary design criterion. Unpredictable breakdowns and long down times have been experienced with pigment-loaded jet ink formulations.

Non-pigmented jet inks completely eliminate this major inherent problem of pigment based jet inks.

The non-pigment, water-free jet ink compositions of the present invention are designed to be completely compatible with commercial jet printing machines available. The inks of the present invention have been formulated with the specific jet ink machine requirements such as viscosity, conductivity, charging and deflecting characteristics.

Opacity is defined as a state which is impervious to light. It is obtained by dispersion of light scattering solids, the degree of which is termed as covering strength. This state of opacity in the prior art is typically achieved with a great amount of pigment solids in fine printing circumstances, like jet ink printing. The dispersion of pigments in jet ink compositions is usually in the bonding and film forming resins. Therefore, the pigment in prior art ink, in order to remain dispersed and suspended requires an optimum quantity of prior art resin. The prior art resin to remain in solution is dependent upon the solvents in which it is borne. Therefore, pigment based prior art inks have to be maintained at above terminal settling bulk density to be consistent and be functioning and be able to print legible, lasting characters. This terminal settling bulk density in a relatively thin ink is very low when compared to other inks and paints. The other inks referred to are lithographic, offset and rotogravure. The rather dynamic state of balance is a very fine line on which the jet printing machines ride. The present invention avoids these strict requirements, since the ink formulations are completely pigment free.

Opacity without the use of pigments has been achieved earlier by the following methods in the corresponding circumstances.

1. Micro void coatings in the Graphic Art applications. A Patent Survey. Industrial and Engineering Chemistry, Vol. 13, No. 1, pages 30–34, 1974. The patents referred to here were awarded to compositions containing cellulose esters that dried to opaque white and were addressed to paints, paper coatings and recording materials.

2. The U.S. Pat. Nos. 4,207,577 and 4,290,072 were awarded to Ishwar R. Mansukhani. The U.S. Pat. No. 4,207,577 for the use of the microvoid phenomenon which requires a secondary moisturizing step. The U.S. Pat. No. 4,290,072 requires and specifies the secondary use of a resin opacifying solvent to render the image opaque.

3. The U.S. Pat. No. 4,352,901 awarded to Messrs. Dorothy Maxwell and David A. Fell for the jet ink compositions consisting of a gellable cellulose ester like cellulose acetate propionate and a binding agent selected from a group of rosin and maleic type resins, polyvinyl acetate and acrylic resins in a solvent blend. The said blend to be of an organic solvent and a non-solvent system. The preferred organic solvents are methanol, acetone, methyl ethyl ketone and ethyl acetate. The preferred non-solvent is water. Upon evaporation of the organic solvent system, the remaining water being the last to leave gels the cellulose ester which in turn creates the microvoids that result in opacity.

It is pointed out that the present invention is clearly different from U.S. Pat. No. 4,352,901 awarded to Messrs. Dorothy Maxwell and David A. Fell. The present invention excludes water or any non-solvent like glycerin for causing the gellation of a cellulose ester resin to manifest as microvoids that inhibit opacity. Additionally, water is particularly excluded due to its very low evaporability at high humidity and atmospheric pressure situations. By contrast, in the invention claimed in the Maxwell patent, water moisture, laden in the air, entering the ink stream through the vacuum system collects in the reservoir or modulation chamber and results in enriching the ink with water under continuous operation. This further slows the drying process and makes the ink susceptible to a state of chemical and physical imbalance.

SUMMARY OF THE INVENTION

The purpose of this invention is to provide a stable opaque jet printing ink with the improved properties of opacity, adhesion and machine compatibility and an improved method for creating opaque images on substrate surfaces. The following compositions do not require water to gel a resin. The presence of water may result in weakness of the matrix and lower the keeping quality of the ink. In addition, the freeze-thaw properties of the ink tend to have a lower threshold due to presence of water.

The objectives of the formulations of this invention are enumerated:

1. To simplify the application method of the jet ink.

2. To provide a relatively simpler formulation by the elimination of a "non-solvent", i.e. water. Water being the non-solvent in the composition, as discussed in U.S. Pat. No. 4,352,901 can be very chemically unpredictable, especially at the threshold limits of pH, temperature and stoichiometric balance. The slightest imbalance may gel or precipitate a resin and precipitate particles may tend to clog the fine tube passages and nozzles of the jet ink printers. This is more likely because the continuous ink jet system is very dynamic at any given instance of running and a make-up quantity is continually being dosed into the flow stream. Besides, water tends to make ink slower drying even though precipitated resin does not dissolve in water. Water may tend to decrease the adhesion of the resultant matrix, especially at threshold limits of operation.

3. To provide a quicker drying and controlled viscous ink by the elimination of the alternate "non-solvent" glycerin. The presence of glycerin tends to dry the ink slower thereby extending cure time. This increases the risk of erasing or defacing the print in the post print section.

4. To provide an abrasion and fade resistant jet ink mark that can withstand moisture and elevated temperature. The abrasion resistance is greatly increased by plasticized resins and the resultant softer films. The ink is readily adherent to non-porous substrate surfaces.

5. To provide a stable ink that can perform in steady state when refluxing unused ink droplets back to the stream.

6. To provide a stable, solvent based, non-pigment ink that dries opaque and adheres rigidly to a variety of substrates including metal, glass, polymer and other non-absorbent substrate surfaces.

7. To provide a jet ink that exhibits an opacity to a high degree of visibility through use of a greater amount of stressed resin which is enhanced by fluorescent acid dyes, chosen according to the general color of the subject substrate.

8. To provide a stable jet ink that would retain good properties and character for at least twelve months from the date of manufacture, when stored at normal ambient conditions.

9. To provide trouble-free, clog-free operation of machinery used in ink jet applications in the intermittent flow mode as in "drop-on-demand" applications, such that sudden velocity reductions in the current of ink flow would not affect the inks consistency and performance.

The following brief description summarizes the form and function of the invention. The jet ink of the present invention is comprised of the following:

1. A Main Film Forming Resin

The film forming resins are, for example, nitrocellulose, ethyl hydroxy ethyl cellulose and ethyl cellulose of a weight percentage of range between 3 and 10. It is preferred to have either of the above film forming resin borne in a ketone, preferably containing three to seven carbon atoms; for example acetone or methyl ethyl ketone. It is also to be noted that these film formers are compatible with alcohols, esters and to a lesser amount ethers. The film forming resins have been found to possess a high degree of compatibility with other resins and almost all types of plasticizers.

2. A Modifying Resin

The modifying resins, whether used singularly or as a combination have been chosen from the following:
Acrylic;
Styrene—Acrylic copolymers;
Alkyd; and
Polyvinyl butyral resins.

The particular choice of the above resins is focused upon the molecular weight, adhesion and film-strength properties of the resultant matrix of the dried ink images (indicia) on the substrate and the viscosity of the ink of this present invention. The choice to a secondary extent depends upon the drying pattern of the indicia (i.e. drying rate and nature) caused by the differential drying rates of two or more resins in the ink. The differential drying causes part of the film-forming resin and modified part to shear and form the amorphous exterior layer of the indicia matrix. The molecular weight of the resins decide the rates of solubilities. Therefore, a choice of combined resins is made to assure that a varied drying rate is available to create a sheared but bound matrix of resinous and dye matter.

3. Solvents and Co-solvents

All solvents and co-solvents are carriers used to solubilize the resins and dyestuffs selected from the group consisting of:

Alcohols—Anhydrous grades of ethanol, methanol, propanol and butanol;
Ketones—Methyl ethyl ketone and acetone;
Esters—Ethyl acetate and butyl acetate; and
Glycol ethers—propylene glycol monomethyl ether, ethylene glycol ethyl ether, and ethylene glycol methyl ether;

such that a differential drying rate is achieved to assure a sheared matrix in the dried indicia forming ink on the substrate.

4. Coalescing Agent

The coalescing agents are amines selected from the group consisting of:
Dimethyl Aminoethanol;
Diethanolamine; and
Morpholine.

The amines are believed to aid in coalescing the dyestuffs and to render more penetration of the ink to the polymer substrates. The quantities of the amines are to be between 1 and 3% on weight basis of the ink composition.

5. Penetrating Agent

A penetrating agent such as N-Methylpyrrolidone is believed to have a penetrating quality and aid in the adhesive capabilities of the ink on polymer substrates with surface tensions of greater than 45 dynes-cm.

6. Dyestuffs and Other Basic Salts.

The dyestuffs are used to add color to the matrix formed and to catalyze the drying pattern by forming a boundary layer between shearing resin film laminates. The dyestuffs used here to perform with the above mentioned duties are acid colors that are soluble in the solvents named. The fluorescent acid dyes are preferred for the attractive colors that contrast greater on dark colored substrates.

7. Plasticizers

Plasticizers are added to the present invention to provide low temperature flexibility, good weathering and abrasion characteristics, light and heat stability, and increase the tensile strength and adhesion of the indicia to the substrate; and to increase the flowability of the composition.

Examples of the plasticizers used in this invention are phthalates and phosphates. The phthalates include butyl benzyl phthalate, diethyl phthalate, dibutyl phthalate and alkyl benzyl phthalate. Phthalates, besides offering an excellent plasticization with strong solvent action, are compatible with all the resins chosen in the formulation. Butyl benzyl phthalate also makes the dry ink film resistant to hydrolysis and fungal attack.

Examples of phosphate plasticizers are 2-ethylhexyl diphenyl phosphate, isodecyl diphenyl phosphate and triphenyl phosphate. Low temperature flexibility, good weathering characteristics and light and heat stability are the properties imparted to the resin matrices. The 2-ethylhexyl diphenyl phosphate imparts a unique combined property shear thinning and rapid fusion to the nitrocellulose film formed during the drying and curing process. This in conjunction with overcoat curing at a different rate, forms cohesive links into one another, forming an overall well-bonded matrix. Hydroxyl numbers of lesser than 3 are found to be very suited to these ink formulations.

8. Adhesion Promoters

Silicones with epoxy methoxy, methacrylate methoxy and vinyl benzyl-amine-methoxy functionalities have found by experimentation to improve the adhesion of a complex of resins to glass, metal and polymer substrates. These silicone additives have also shown improvements in the ink in regard to moisture resistance.

9. Conductivity Agents

Jet printing inks are required to be conductive in order for the drops to receive an electric charge. The specific conductivities of the liquid inks are dependent upon the printing equipment. The inks are standardized to the respective specific conductivities by means of solvent soluble, non-reactive compounds such as, propionates of sodium or potassium, ammonium thiocyanate, ammonium acetate and dimethyl amine hydrochloride. Typical quantities range between 0.05 and 1.5 weight percentage absolute of the ink.

The function of the ink is as follows:

Continuous Inkjet (CIJ)

The ink modulates into a series of discrete droplets from a fine-bored nozzle, which passes through a space subject to a high electrostatic field. The drops which are now charged deflect according to the coded message on the substrate. Only a very small portion of the ink stream is utilized for application to the substrate, the remainder of the ink is returned to the ink holding reservoir. The ink discharged from the print nozzle travels through the exterior until it reaches the vacuum receiving gutter. During this travel period the ink is exposed to atmospheric pressure, where the solvents flash off. Ink that returns to the reservoir is lean in solvents. This stream of ink returning to the reservoir is laden with air and is at a pressure. The air and pressure are vented continuously at the reservoir. This venting carries out some solvent vapor, thus, some solvent vapor is continuously lost from the stream. In a continuous operation mode, the ink gets leaner in solvents and the loss has to be made up to maintain the consistency of the ink for uniform print quality.

Drop-On Demand (DOD)

The ink is on a one way stream where it is drawn from a reservoir either by positive pressure or suction. The ink is filled into the controlled volume of a vibrating chamber. The piezoelectric vibrations are coded to produce messages. The fine droplets are spurted on to the substrates. All the ink leaving the nozzle is used to code messages. No part of the ink is returned to the machine reservoir system. This type of application process does not require a makeup solution.

Overall the ink formulations are suited to the main two classes of ink jet printing apparatus and produces clean, opaque indicia on substrates.

The Drying Process

In the ink that is applied to the substrates, irrespective of the application procedure, a unique drying process occurs. The solvents begin to flash off from the ink composition immediately after the ink is exposed to the atmosphere. The drying process of the ink continues as the base, base film or base layer, which is closest to the substrate, begins to dry and adhere to the substrate. At the same time the exterior, exterior layer, which is farthest from the substrate, begins to dry too. In most applications, the base layer and exterior layer dry at different rates. The intermediate layer consisting of modified resin dries at yet a third and slower rate. The resultant process of differential drying rates causes a fractionated shearing between the different layers, interconnected by a plasticizer aided matrix. The resultant product is an opaque indicia on the surface of the substrate.

Use of the ink of the present invention to provide improved opaque indicia on substrate surfaces is consistent with the method of the present invention.

DETAILED DESCRIPTION OF THE INVENTION

This invention deals with a water-free, non-pigmented jet ink composition which produces opaque indicia on a variety of substrates.

In order for the formulations to work successfully the following basic requirements are essential.

1. Viscosity:

The ink viscosity is to be in the range of 1.5 to 20 centipoises at 25° C. The viscosities may vary according to the apparatus' drop modulation specifications.

2. Conductivity:

The conductivity is to be in the range of 600 Micromhos-cm to 2500 Micromhos-cm at 25° C. The conductivity requirements vary according to the apparatus' charging capabilities.

3. Adhesion:

The adhesion of the printed matrix on glass, metal, polymer and other substrates should be readily exhibited as soon as the ink dries. The drying period of ink matrix is to be less than 30 seconds. The dry matrix is to be smear resistant.

4. Temperature and Humidity Stability:

The printed matrix should be integral and fade resistant at extremes of temperature and humidity that are frequently encountered in container filling and packaging production lines.

5. Freeze-Thaw Stability:

The ink should be able to undergo several freeze-thaw cycles and remain consistent in its properties. There are no ingredients to precipitate or crystallize out of solution, thereby rendering consistent functionality of the ink.

6. The ink is to be compatible with the printing equipment. The ink has to be able to modulate into drops of size and shape defined by the machine.

7. The storage life is of the ink to be a minimum of 12 months. The ink should be able to produce an opaque image even after a reasonable period of time in storage.

Components of the Composition

Film Forming Resins

The film forming resins used in the formulations are essentially a nitrate of cellulose with nitrogen content of between 11.8 and 12.2 percentage by weight. The tensile strength and hardness of the unplasticized film of nitrocellulose are amongst the highest of good film formers. The other favorable properties are its low moisture absorption, general resistance to chemicals and oils, slight aging effect and its resistance to water. The almost universal compatibility of nitrocellulose with other resins, both film forming and adhesive types, is of great utility in this invention. The grade of nitrocellulose used in the formulations is the RS 1/4 seconds type of Hercules Aqualon. The weight percentage of dry nitrocellulose used in the composition is preferably between 3 and 10. The amount is mainly determined by the targeted viscosity which is ideally between 1.5 and 20 cp. The nitrocellulose resin is soluble in the solvent blend and forms the base film on which the modified layer of resin and dye are anchored. The nitrocellulose is plasticized by a phosphatic plasticizer, 2-ethyl hexyl diphenyl phosphate. It has been found that a 1 to 4 parts by weight of plasticizer to 100 parts by weight of dry resin is most favorable for the level of film strength, hardness and adhesion desired. It is also believed that the adhering resins in use modify the film forming nitrocellulose to improve its resistance to abrasion.

The alternative film forming resins are ethyl hydroxy ethyl cellulose and ethyl cellulose.

The Modifying Resins

The preferred modifying resins and their respective quantities are chiefly dependent upon the optimum level of opacity and adhesion obtainable. Abrasion resistance and green strength depend upon the resin solids in the ink. The alkyd resins found suited to this type of drying by shearing pattern are of the short oil grades that are air dryable and curable. In all cases, the modifying resin should possess a glass transition temperature in the range of 60 to 85 degrees centigrade. The modifying resins, besides enhancing the adhesion of the film forming resin, enhance the chemical resistance and mechanical properties as well. These resins are all soluble in a blend of solvents and are found to be compatible with the film forming resin in all proportions. Long term compatibility tests have been run to establish compatibility and maintenance of resin properties. The solvent blend used is a mixture of methanol, ethanol, methyl ethyl ketone, ethyl acetate, isomers of propanol and isomers of butanol. Since it is preferred to keep the pH of the ink composition as close to 7, or neutral, as possible and as water-free as possible, anhydrous grades of the above mentioned solvents are preferred. The quantity of the modifying resin is chosen dependent upon the individual molecular weights, solution viscosity, opacity required and the individual application niceties.

The ratio of the main resin to the modifying resin is as follows: for every part by weight of the film forming resin a sixth to a quarter part by weight of the modifying resin is found to be optimum for modification and formation of a semi-sheared opaque stratification above the base film in the indicia.

It is believed that the intermediate layer between the base and the exterior forms laminates of micro laminate miscelli formed by shearing away from the extremities of the chains and side chains in the film forming layer. This property is enhanced by an intermediately evaporating solvent, in which the film-former has limited solubility. To ensure that at least a part of the modified film forming resin is stressed to form micro laminate miscelli, the intermediately evaporating solvent is provided in excess of the other solvents to ensure that the resins remain in solution in at least one strata of the drying formation after the base and the exterior layers have both dried. Methanol has been found to be an ideal intermediately evaporating solvent. The degree of opacity is greatly decided by the quantity of modified resin stressed by the intermediately evaporating solvent, and is found to be in direct proportion thereto. Conversely, the greater the quantity of modifying resin or intermediately evaporating solvent the weaker the adhesion. Therefore a dynamic balance range has to be maintained to achieve a good degree of opacity and adhesion.

By experimentation the acrylics and styrenated acrylics seem to have a controllable balance of properties in the above defined range.

Solvents and Co-solvents

The solvents and co-solvents are used to solubilize the resins and dyestuffs, and form the main vehicle of the jet inks. There is also a dynamic function of the solvents. The solvent or solvents that have an intermediate evaporation rate stress a portion of the modified resin that manifests as micro laminate miscelli and results in an opaque matrix.

The solvents and co-solvents are essentially to be of anhydrous grade and strictly free of hydrocarbon compounds, since to do otherwise seems to hinder opacity development and provides unacceptable drying patterns.

The properties of the solvents and co-solvents that directly influence the form and function of the ink composition are evaporation rate (in comparison to the rate of normal butyl acetate being normalized at 1) and flash point. These properties directly relate to the drying pattern of the ink.

The group from which the solvents and co-solvents are selected along with some of their properties is as follows:

|  | Evaporation Rate | Flash Point °F. TCC | Vapor Pressure mm Hg @ 20° C. | Quantity Range Preferred Weight % |
|---|---|---|---|---|
| Alcohols |  |  |  |  |
| Ethanol | 1.90 | 54 | 44.0 | 3–10 |
| Methanol | 3.50 | 54 | 96.0 | 22–55 |
| Normal Propanol | 0.89 | 71 | 14.5 | 1–3 |
| Isopropanol | 1.70 | 53 | 31.2 | 2–7 |
| Normal Butanol | 0.46 | 97 | 4.4 | 1–3 |
| Ketones |  |  |  |  |
| Methyl Ethyl Ketone | 4.60 | 23 | 85.0 | 12–29 |
| Acetone | 7.70 | −4 | 185.0 | 0.5–2.0 |
| Esters |  |  |  |  |
| Ethyl Acetate | 4.10 | 24 | 76.0 | 10–20 |
| Normal Propyl Acetate | 2.30 | 55 | 23.0 | 3–8 |
| Normal Butyl Acetate | 1.00 | 76 | 7.8 | 1–3 |

-continued

| | | Evaporation Rate | Flash Point Open Cup °F. | Vapor Pressure mm Hg @ 20° C. | Quantity Range Preferred Weight % |
|---|---|---|---|---|---|
| Ethers | | | | | |
| Propylene Glycol Monomethyl Ether | PM | 0.50 | 120 | 9.7 | 0.5–2 |
| Ethylene Glycol Ethyl Ether | EE | 0.20 | 110 | 5.3 | 1–4 |
| Ethylene Glycol Methyl Ether | EM | 0.66 | 94 | 10.9 | 1–4 |

It has been found that Methyl Ethyl Ketone or Ethyl Acetate are preferred solvents for the film forming resin. Methanol is a preferred intermediately evaporating solvent. Ethanol and/or Isopropanol are the main solvents which evaporate from the indicia during the curing stage. Normal propanol, normal butanol, normal propyl acetate and normal butyl acetate are used in proportionate amounts to correct the drying rates to the desired level to achieve the optimum of adhesion to opacity balance.

The co-solvents are used to coalesce the dyes and resins with the solvent blend. It is to be noted that the glycol ethers chosen are to be lesser than a flash point of 120° F., (open cup method). The glycol ethers also tend to enhance the fluorescence of the dyes in the matrix. The targeted drying rate is achieved by adding precise quantities of the glycol ethers. The glycol ethers have also been known to provide lubrication and detergency in the circuit of ink flow in the machinery utilized with the present invention.

Coalescing Agent

Dimethyl Aminoethanol, Triethanolamine and Morpholine have been used up to 1% by weight of the ink to aid in coalescing the acid dyestuffs, besides rendering more penetrating power to the resin on substrates, especially polymer substrates. The amines aid in hydrolysing the skin surface of polymers and therefore anchor the ink to the substrate.

Penetrating Agent

N-Methylpyrrolidone is believed to have penetrating and adhesive capabilities on polymer substrates with high surface tensions of greater than 45 dynes-cm. Such untreated surfaces require inks with more penetrative and anchoring power. Quantities of up to 1.5% by weight have been used with success.

Dyestuffs and Other Basic Salts

Acid dye colors especially with fluorescence aid in bringing more contrasting shades to the opacified matrix. A list of possible acid dyes includes:

1. C.I. Acid Yellow 7—Sulfoflavine Acid Yellow
2. C.I. Acid Yellow 73—Uranine Fluorescein
3. C.I. Acid Red 44—Rose Bengal
4. C.I. Solvent Red 49—Rhodamine B Base
5. C.I. Acid Orange 7—Naphthalene Orange 7
6. C.I. Acid Orange 52—Methyl Orange
7. C.I. Acid Blue 9—Acid Blue The quantities preferred are between 0.5 and 2.5% by weight of the ink composition.

Urea ($H_2NCONH_2$) has been tried in a typical formulation and was utilized up to 0.5% by weight to obtain a white opacity.

Plasticizers

The plasticizers for the respective main film forming resin and the modifying resin, have been described earlier in detail. The phosphate and phthalate plasticizers are used at between 0.75 part of plasticizer per hundred of dry resin to 2.25 parts of plasticizer per hundred of dry resin.

Adhesion Promoters

Very small quantities of silicone compounds with epoxy methoxy, methacrylate methoxy and vinyl benzyl-amine-methoxy functional groups have been found effective in helping to anchor the ink to the substrate. The quantities found to be beneficial are between 0.1 to 0.6 percentage by weight of the absolute mass of the ink.

Conductivity Agents

Compounds found conducive to ideal conductivity in accordance with the present invention are propionates of sodium or potassium, Ammonium thiocyanate, Ammonium acetate and Dimethyl amine hydrochloride are found to be soluble in the blend of organic solvents without discoloration or hindering with the constitution of the resin or dyestuffs. The conductivities of the inks are standardized to be between 750 and 2500 Micromhos-cm with the use of any one or combination of the above named compounds. The various jet printing machines under the CIJ principle of operation need inks with specific conductivities.

Make-Up Solutions

In the case of continuous ink jet applications, the ink is on a continuous stream starting from the reservoir; through the printing mechanism; and back to the reservoir. The ink is exposed to atmospheric conditions between the drop ejector nozzle and the collection gutter. During this atmospheric exposure period the solvents, carrying the ink, flash-off into the atmosphere according to their rates of evaporation. A larger quantity of solvent is lost when air and pressure are vented from the reservoir continuously. The quantities of the respective solvents depend upon their respective proportions in the stream, the individual rates of evaporation, ambient temperature, relative humidity and barometric pressure. Therefore, in order for the ink to remain consistent in its form and function; the quantities of solvents lost in the stream have to be made up by adding proportionate quantities of solvents lost. The proportion is defined by their respective masses in the ink and their rates of evaporation. An empirical calculation is made to define the quantities of the make-up solution. The faster evaporating solvents have added quantities and conversely the slower evaporating co-solvents have reduced quantities. Therefore a realistic make-up solution proportion is derived for each individual formula. Various formulae of inks and their respective make-up solutions are numerically elaborated in the succeeding section of the document.

The formula of the make-up solution has to be accurately adhered to for consistent ink characteristics and function. Typical formulations are listed in the tables below.

Typical Formulations

The formulations are for the ink and the respective make-up solutions.

|  | Wt. % |
|---|---|
| Formulation 1 - Ink | |
| Methyl Ethyl Ketone | 25.25 |
| Methanol | 49.00 |
| Ethyl Acetate | 5.00 |
| Glycol Ether PM propylene glycol methyl ether | 3.00 |
| RS ¼th sec. Nitrocellulose (a) cellulose nitrate | 11.00 |
| Joncryl 67 Acrylic resin (b) styrene-acrylic polymer | 2.50 |
| Joncryl 678 Acrylic resin (b) styrene-acrylic polymer | 1.00 |
| Santicizer 141 Plasticizer (c) 2-ethylhexyl diphenyl phosphate | 0.2 |
| Santicizer 160 Plasticizer (c) butyl benzyl phthalate | 0.05 |
| Dow-Corning Z 6032 silane (d) a mixture of vinyl benzyl (trimethoxysilyl)-propylethanediamine hydrochloride and aminoethyl aminopropyl trimethoxy silane in methanol | 0.25 |
| Uranine acid yellow dye | 1.75 |
| Ammonium Thiocyanate | 0.50 |
| Dimethyl Aminoethanol | 0.50 |
| Formulation 1 - Make-up Solution | |
| Methyl Ethyl Ketone | 31.48 |
| Methanol | 62.00 |
| Ethyl Acetate | 6.00 |
| Glycol Ether PM propylene glycol methyl ether | 0.50 |
| Santicizer 141 (c) adhoc 2-ethylhexyl diphenyl phosphate | 0.01 |
| Santicizer 160 (c) adhoc butyl benzyl phthalate | 0.01 |
| Ammonium Thiocyanate | 0.2 |
| Formulation 2 - Ink | |
| Methyl Ethyl Ketone | 26.50 |
| Methanol | 41.40 |
| Ethanol | 8.75 |
| Ethyl Acetate | 5.00 |
| Glycol Ether EE ethylene glycol ethyl ether | 1.50 |
| RS ¼th Sec. Nitrocellulose (a) cellulose nitrate | 10.00 |
| Joncryl 67 Acrylic resin (b) styrene-acrylic polymer | 2.00 |
| Joncryl 678 Acrylic resin (b) styrene-acrylic polymer | 1.00 |
| Santicizer 141 plasticizer (c) 2-ethylhexyl diphenyl phosphate | 0.2 |
| Santicizer 160 plasticizer (c) butyl benzyl phthalate | 0.05 |
| Dow-Corning Z 6032 silane a mixture of vinyl benzyl (trimethoxysilyl)-propylethanediamine hydrochloride and aminoethyl aminopropyl trimethoxy silane in methanol | 0.25 |
| Uranine yellow acid dye | 2.00 |
| Ammonium Acetate | 0.75 |
| Diethanolamine | 0.60 |
| Formulation 2 - Make-up Solution | |
| Methyl Ethyl Ketone | 31.8 |
| Methanol | 51.5 |
| Ethanol | 10.3 |
| Ethyl Acetate | 5.9 |
| Glycol Ether EE ethylene glycol ethyl ether | 0.3 |
| Santicizer 141 (c) adhoc 2-ethylhexyl diphenyl phosphate | 0.05 |
| Santicizer 160 (c) adhoc butyl benzyl phthalate | 0.05 |
| Ammonium Acetate | 0.2 |
| Formulation 3 - Yellow Ink | |
| Methyl Ethyl Ketone | 32.5 |
| Methanol | 48.0 |
| Glycol Ether PM propylene glycol methyl ether | 2.0 |
| RS ¼th sec. Nitrocellulose (a) cellulose nitrate | 10.0 |
| Joncryl 67 Acrylic resin (b) styrene-acrylic polymer | 2.0 |
| Gelva Polyvinyl Acetate V ½ (e) polyvinyl acetate | 2.0 |
| Santicizer 141 Plasticizer (c) 2-ethylhexyl diphenyl phosphate | 0.2 |
| Santicizer 160 Plasticizer (c) butyl benzyl phthalate | 0.05 |
| Dibutyl Phthalate | 0.05 |
| Dow-Corning Z 6030 (d) a mixture of methacryloxypropyltrimethoxy silane and silane esters | 0.2 |
| Uranine Acid Yellow Dye | 2.0 |
| Ammonium Thiocyanate | 0.5 |
| Dimethyl Aminoethanol | 0.5 |
| Formulation 3 - Make-up Solution | |
| Methyl Ethyl Ketone | 38.2 |
| Methanol | 61.3 |
| Glycol Ether PM propylene glycol methyl ether | 0.3 |
| Santicizer 141 (c) adhoc 2-ethylhexyl diphenyl phosphate | 0.02 |
| Santicizer 160 (c) adhoc butyl benzyl phthalate | 0.02 |
| Dibutyl Phthalate adhoc | 0.02 |

|  | Wt. % |
|---|---|
| Ammonium Thiocyanate | 0.2 |
| Formulation 4 - White Ink | |
| Methyl Ethyl Ketone | 31.00 |
| Methanol | 48.00 |
| Glycol Ether PM propylene glycol methyl ether | 2.0 |
| RS ¼th sec. Nitrocellulose (a) cellulose nitrate | 12.35 |
| Joncryl 67 Acrylic Resin (b) styrene acrylic polymer | 3.0 |
| Joncryl 61 Acrylic Resin (b) styrene acrylic polymer | 1.0 |
| Santicizer 141 Plasticizer (c) 2-ethylhexyl diphenyl phosphate | 0.2 |
| Santicizer 160 Plasticizer (c) butyl benzyl phthalate | 0.05 |
| Dow-Corning 25 additive (d) a mixture of glycidoxypropyltrimethoxy silane and hexametheoxylmelamine | 0.3 |
| Urea | 1.0 |
| Ammonium Thiocyanate | 0.6 |
| Formulation 4 - Make-up Solution | |
| Methyl Ethyl Ketone | 38.5 |
| Methanol | 61.0 |
| Glycol Ether PM propylene glycol methyl ether | 0.3 |
| Santicizer 141 (c) adhoc 2-ethylhexyl diphenyl phosphate | 0.02 |
| Santicizer 160 (c) adhoc butyl benzyl phthalate | 0.02 |
| Ammonium Thiocyanate | 0.2 |
| Formulation 5 - Red Ink | |
| Methyl Ethyl Ketone | 15.3 |
| Ethanol | 10.5 |
| Methanol | 51.0 |
| Glycol Ether PM propylene glycol methyl ether | 2.0 |
| Normal Propyl Acetate | 5.0 |
| Acid Rhodamine Dye | 3.3 |
| Key Acid Uranine Dye | 2.0 |
| RS ¼th Nitrocellulose resin (a) cellulose nitrate | 5.6 |
| Joncryl 67 Acrylic Resin (b) styrene acrylic polymer | 3.6 |
| Santicizer 141 Plasticizer (c) 2-ethylhexyl diphenyl phosphate | 0.5 |
| Santicizer 160 Plasticizer (c) butyl benzyl phthalate | 0.5 |
| Ammonium Thiocyanate | 0.4 |
| Dow-Corning Z 6032 silane (d) a mixture of vinyl benzyl (trimethoxysilyl)-propylethanediamine hydrochloride and aminoethyl aminopropyl trimethoxy silane in methanol | 0.3 |
| Formulation 5 - Make-up Solution | |
| Methyl Ethyl Ketone | 18.8 |
| Ethanol | 13.0 |
| Methanol | 61.9 |
| Glycol Ether PM propylene glycol methyl ether | 0.3 |
| N Propyl Acetate | 6.0 |
| Santicizer 141 (c) adhoc 2-ethylhexyl diphenyl phosphate | 0.01 |
| Santicizer 160 (c) adhoc butyl benzyl phthalate | 0.01 |
| Formulation 6 - Blue Ink | |
| Methyl Ethyl Ketone | 17.0 |
| Ethanol | 14.0 |
| Methanol | 48.4 |
| Glycol Ether EM | 2.0 |
| N-Methylpyrrolidone | 1.0 |
| Acid Blue 9 | 3.0 |
| Tinopal CBS (f) benzenesulfonic acid,2,2'-(4,4'-biphenylylenedivinylene)di-,disodium salt, CAS. #27344-41-8 $C_{28}H_{20}O_6S_2 \cdot 2Na$ | 0.3 |
| RS ¼th sec. Nitrocellulose resin (a) cellulose nitrate | 10.0 |
| Joncryl 67 Acrylic Resin (b) styrene acrylic polymer | 2.3 |
| Santicizer 141 Plasticizer (c) 2-ethylhexyl diphenyl phosphate | 0.3 |
| Santicizer 160 Plasticizer (c) butyl benzyl phthalate | 0.05 |
| Dow-Corning Z 6032 silane (d) a mixture of vinyl benzyl (trimethoxysilyl)-propylethanediamine hydrochloride and aminoethyl aminopropyl trimethoxy silane in methanol | 0.25 |
| Ammonium Thiocyanate | 0.60 |
| Diethanolamine | 0.60 |
| Formulation 6 - Make-up Solution | |
| Methyl Ethyl Ketone | 21.6 |
| Ethanol | 17.5 |
| Methanol | 60.0 |
| Glycol Ether EM | 0.5 |
| N-Methylpyrrolidone | 0.2 |
| Ammonium Thiocyanate | 0.2 |

-continued

| | Wt. % |
|---|---|
| Formulation 7 - Green Ink | |
| Methyl Ethyl Ketone | 17.0 |
| Ethanol | 14.0 |
| Methanol | 48.7 |
| Glycol Ether PM propylene glycol methyl ether | 2.0 |
| N-Methylpyrrolidone | 1.0 |
| Acid Blue 9 | 0.6 |
| Sulfoflavine Acid Yellow | 2.4 |
| Tinopal CBS (f) | 0.3 |
| RS ¼th sec. Nitrocellulose resin (a) cellulose nitrate | 10.0 |
| Joncryl 67 Acrylic Resin (b) | 2.3 |
| Santicizer 141 Plasticizer (c) 2-ethylhexyl diphenyl phosphate | 0.3 |
| Santicizer 160 Plasticizer (c) | 0.05 |
| Dow-Corning Z 6032 silane (d) a mixture of vinyl benzyl (trimethoxysilyl)-propylethanediamine hydrochloride and aminoethyl aminopropyl trimethoxy silane in methanol | 0.25 |
| Ammonium Thiocyanate | 0.60 |
| Diethanolamine | 0.50 |
| Formulation 7 - Make-up Solution | |
| Methyl Ethyl Ketone | 21.6 |
| Ethanol | 17.6 |
| Methanol | 60.1 |
| Glycol Ether PM propylene glycol methyl ether | 0.5 |
| Ammonium Thiocyanate | 0.2 |
| Santicizer 141 (c) adhoc 2-ethylhexyl diphenyl phosphate | 0.01 |
| Santicizer 160 (c) adhoc butyl benzyl phthalate | 0.01 |

An adhoc quantity of hindered amine light stabilizer, about 0.1 to 0.15 percentage by weight, has been used to stabilize the inks against the degradability of U.V. radiation. Unvinyls of BASF Corporation have proven to be a good protection against U.V. radiation degradability.

Some quantity of Acetone has been tried in certain formulations to speed up drying, and the corresponding changes in the make-up solution formulations have been adopted.

(a) Hercules Aqualon Product
(b) S.C. Johnson Wax Product
(c) Monsanto & Co. Product
(d) Dow-Corning Product
(e) Monsanto Polymers

The Mechanism of the Non-Pigmented Ink in Producing Opaque Images

It is hypothesized and believed that a portion of the modified and plasticized film forming resin and the adhesion resin shear when drying at differential rates due to the differential solubilities of the organic solvents in the blend in which both major function resins are solubilized. It is also believed that the acid dyes promote this shear thinning besides enhancing the color of the laminar, amorphous but bound opaque matrix. The plasticization and promoted binding action keeps the sheared but anchored amorphous dye and resin particles in tact on the laminar film formed by the nitrocellulose resin. The dense amorphous array of sheared particles scatter light incident on the matrix rendering the entire laminate opaque.

The method of the present invention consists of:

1) providing a substrate surface upon which the indicia will be applied;

2) providing a non-pigmented, moisture-free, stable jet ink composition;

3) applying said ink composition to the substrate in a desired arrangement to produce the selected indicia; and 4) drying said ink composition on said substrate to bond the same and create an indelible, abrasion resistant, climatically stable and opaque indicia on the substrate.

The examples above are intended to be illustrative only, and are not to be construed as in any way limiting the invention defined by the claims which follow.

What is claimed is:

1. A non-pigmented jet ink composition for producing opaque indicia on a non-porous substrate, which upon drying becomes opaque without applying moisture upon application to said substrate, consisting of: by weight of said ink composition:

A) 3 to 10% of a film forming resin selected from the group consisting of:
1) nitrates of cellulose having a nitrogen content of between 11.8 and 12.2% by weight;
2) ethyl hydroxy ethyl cellulose; and
3) ethyl cellulose;

B) 0.5 to 2.5% of a modifying resin selected from the group consisting of:
1) Acrylics;
2) Styrene-Acrylic Co-polymers;
3) Alkyds; and
4) Polyvinyl Butyral Resins; and C) 55 to 85% of a solvent blend consisting of: at least one solvent selected from the group consisting of:
1) Alcohols;
2) Ketones;
3) Esters; and
4) Glycol Ethers.

2. The jet ink composition of claim 1 including, between 0.75 to 2.5 parts by weight of a (D)plasticizer selected from the group consisting of:
1) Butyl Benzyl Phthalate;
2) Diethyl Phthalate;
3) Dibutyl Phthalate;
4) Alkyl Benzyl Phthalate;
5) 2-Ethyl Hexyl Diphenyl Phosphate;
6) Isodecyl Diphenyl Phosphate; and
7) Triphenyl Phosphate;
for every 100 parts by weight of the total weight of the resins.

3. The jet ink composition of claim 2 including, between 1 to 3% by weight of the absolute ink composition, a (E)coalescing agent selected from the group consisting of:
1) Dimethyl Aminoethanol;
2) Diethanolamine; and
3) Morpholine.

4. The jet ink composition of claim 3 including, between 0.1 to 0.6% by weight of the absolute mass of the ink composition, an (F)adhesion promoter selected from the group consisting of Silicone compounds with:
1) epoxy methoxy;
2) methacrylate methoxy; and
3) vinyl benzyl-amine-methoxy
functionalities.

5. The jet ink composition of claim 4 including, between 0 to 1.5% by weight of the absolute mass of ink composition, a (G)penetrating agent comprising N-Methylpyrrolidone.

6. The jet ink composition of claim 5 including, between 0.5 to 2.5% by weight of the absolute mass of ink composition, a (H)coloring agent selected from the group consisting of:
1) C.I. Acid Yellow 7—Sulfoflavine Acid Yellow;

2) C.I. Acid Yellow 73—Uranine Fluorescein;
3) C.I. Acid Red 44—Rose Bengal;
4) C.I. Solvent Red 49—Rhodamine B Base;
5) C.I. Acid Orange 7—Naphthalene Orange 7;
6) C.I. Acid Orange 52—Methyl Orange; and
7) C.I. Acid Blue 9—Acid Blue.

7. The jet ink composition of claim 6 including, between 0.05 to 1.5% by weight of the absolute mass of ink composition, a (I)conductivity agent selected from the group consisting of:
1) Propionates of Sodium and Potassium;
2) Ammonium Thiocyanate;
3) Ammonium Acetate; and
4) Dimethyl Amine Hydrochloride.

8. A non-pigmented jet ink composition for producing opaque indicia on a non-porous substrate, which upon drying becomes opaque without applying moisture upon application to said substrate, consisting of: by weight of said ink composition:
A) 3 to 10% of a film forming resin selected from the group consisting of:
  1) nitrates of cellulose having a nitrogen content of between 11.8 and 12.2% by weight;
  2) ethyl hydroxy ethyl cellulose; and
  3) ethyl cellulose;
B) 0.5 to 2.5% of a modifying resin selected from the group consisting of:
  1) Acrylics;
  2) Styrene-Acrylic Co-polymers;
  3) Alkyds; and
  4) Polyvinyl Butyral Resins;
C) 55 to 85% of a solvent blend consisting of: at least two solvents selected from the group consisting of:
  1) ethanol;
  2) methanol;
  3) propanol;
  4) butanol;
  5) methyl ethyl ketone;
  6) acetone;
  7) ethyl acetate;
  8) butyl acetate;
  9) propylene glycol monomethyl ether;
  10) ethylene glycol ethyl ether; and
  11) ethylene glycol methyl ether; and
(D) 0.75 to 2.5 parts by weight of a plasticizer selected from the group consisting of:
  1) Butyl Benzyl Phthalate;
  2) Diethyl Phthalate;
  3) Dibutyl Phthalate;
  4) Alkyl Benzyl Phthalate;
  5) 2-Ethyl Hexyl Diphenyl Phosphate;
  6) Isodecyl Diphenyl Phosphate; and
  7) Triphenyl Phosphate;
for every 100 parts by weight of the total weight of the resins.

9. The jet ink composition of claim 8 including, between 1 to 3% by weight of the absolute ink composition, a (E)coalescing agent selected from the group consisting of:
1) Dimethyl Aminoethanol;
2) Diethanolamine; and
3) Morpholine.

10. The jet ink composition of claim 9 including, between 0.1 to 0.6% by weight of the absolute mass of the ink composition, an (F)adhesion promoter selected from the group consisting of Silicone compounds with:

1) epoxy methoxy;
2) methacrylate methoxy; and
3) vinyl benzyl-amine-methoxy functionalities.

11. The jet ink composition of claim 10 including, between 0 to 1.5% by weight of the absolute mass of ink composition, a (G)penetrating agent comprising N-Methylpyrrolidone.

12. The jet ink composition of claim 11 including, between 0.5 to 2.5% by weight of the absolute mass of ink composition, a (H)coloring agent selected from the group consisting of:
1) C.I. Acid Yellow 7—Sulfoflavine Acid Yellow;
2) C.I. Acid Yellow 73—Uranine Fluorescein;
3) C.I. Acid Red 44—Rose Bengal;
4) C.I. Solvent Red 49—Rhodamine B Base;
5) C.I. Acid Orange 7—Naphthalene Orange 7;
6) C.I. Acid Orange 52—Methyl Orange; and
7) C.I. Acid Blue 9—Acid Blue.

13. The jet ink composition of claim 12 including, between 0.05 to 1.5% by weight of the absolute mass of ink composition, a (I)conductivity agent selected from the group consisting of:
1) Propionates of Sodium and Potassium;
2) Ammonium Thiocyanate;
3) Ammonium Acetate; and
4) Dimethyl Amine Hydrochloride.

14. A non-pigmented jet ink composition for producing opaque indicia on a non-porous substrate consisting of: by weight of said ink composition:
A) 3 to 10% of a film forming resin selected from the group consisting of:
  1) nitrates of cellulose having a nitrogen content of between 11.8 and 12.2% by weight;
  2) ethyl hydroxy ethyl cellulose; and
  3) ethyl cellulose;
B) 0.5 to 2.5% of a modifying resin selected from the group consisting of:
  1) Acrylics;
  2) Styrene-Acrylic Co-polymers;
  3) Alkyds; and
  4) Polyvinyl Butyral Resins;
C) 55 to 85% of a solvent blend consisting of: at least two solvents selected from the group consisting of:
  1) ethanol;
  2) methanol;
  3) propanol;
  4) butanol;
  5) methyl ethyl ketone;
  6) acetone;
  7) ethyl acetate;
  8) butyl acetate;
  9) propylene glycol monomethyl ether;
  10) ethylene glycol ethyl ether; and
  11) ethylene glycol methyl ether;
(D) 0.75 to 2.5 parts by weight of a plasticizer selected from the group consisting of:
  1) Butyl Benzyl Phthalate;
  2) Diethyl Phthalate;
  3) Dibutyl Phthalate;
  4) Alkyl Benzyl Phthalate;
  5) 2-Ethyl Hexyl Diphenyl Phosphate;
  6) Isodecyl Diphenyl Phosphate; and
  7) Triphenyl Phosphate;

for every 100 parts by weight of the total weight of the resins;

(E) 1 to 3% of a coalescing agent selected from the group consisting of:
1) Dimethyl Aminoethanol;
2) Diethanolamine; and
3) Morpholine;

(F) 0.1 to 0.6% of an adhesion promoter selected from the group consisting of Silicone compounds with:
1) epoxy methoxy;
2) methacrylate methoxy; and
3) vinyl benzyl-amine-methoxy
functionalities;

(G) 0 to 1.5% of a penetrating agent comprising N-Methylpyrrolidone;

(H) 0.5 to 2.5% of a coloring agent selected from the group consisting of:
1) Acid Yellow 7—Sulfoflavine Acid Yellow;
2) C.I. Acid Yellow 73—Uranine Fluorescein;
3) C.I. Acid Red 44—Rose Bengal;
4) C.I. Solvent Red 49—Rhodamine B Base;
5) C.I. Acid Orange 7—Naphthalene Orange 7;
6) C.I. Acid Orange 52—Methyl Orange; and
7) C.I. Acid Blue 9—Acid Blue; and (I) 0.05 to 1.5% of a conductivity agent selected from the group consisting of:
1) Propionates of Sodium and Potassium;
2) Ammonium Thiocyanate;
3) Ammonium Acetate; and
4) Dimethyl Amine Hydrochloride.

15. A method for creating opaque indicia, consisting of:
1) providing a substrate surface upon which the indicia will be applied;
2) providing a non-pigmented jet ink composition consisting of: by weight of said ink composition:
A) 3 to 10% of a film forming resin selected from the group consisting of:
1) nitrates of cellulose having a nitrogen content of between 11.8 and 12.2% by weight;
2) ethyl hydroxy ethyl cellulose; and
3) ethyl cellulose;
B) 0.5 to 2.5% of a modifying resin selected from the group consisting of:
1) Acrylics;
2) Styrene-Acrylic Co-polymers;
3) Alkyds; and
4) Polyvinyl Butyral Resins; and
C) 55 to 85% of a solvent blend consisting of: at least one solvent selected from the group consisting of:
1) Alcohols;
2) Ketones;
3) Esters; and
4) Glycol Ethers;
3) applying said ink composition to the substrate in a desired arrangement to produce the selected indicia; and
4) drying said ink composition on said substrate to bond the same and create an indelible, abrasion resistant, climatically stable and opaque indicia on the substrate.

16. The method of claim 15, said step of providing a non-pigmented jet ink composition, further including the provision of: between 0.75 to 2.5 parts by weight of a (D)plasticizer selected from the group consisting of:
1) Butyl Benzyl Phthalate;
2) Diethyl Phthalate;
3) Dibutyl Phthalate;
4) Alkyl Benzyl Phthalate;
5) 2-Ethyl Hexyl Diphenyl Phosphate;
6) Isodecyl Diphenyl Phosphate; and
7) Triphenyl Phosphate;
for every 100 parts by weight of the total weight of the resins.

17. The method of claim 16, said step of providing a non-pigmented jet ink composition, further including the provision of: between 1 to 3% by weight of the absolute ink composition, a (E)coalescing agent selected from the group consisting of:
1) Dimethyl Aminoethanol;
2) Diethanolamine; and
3) Morpholine.

18. The method of claim 17, said step of providing a non-pigmented jet ink composition, further including the provision of: between 0.1 to 0.6% by weight of the absolute mass of the ink composition, an (F)adhesion promoter selected from the group consisting of Silicone compounds with:
1) epoxy methoxy;
2) methacrylate methoxy; and
3) vinyl benzyl-amine-methoxy
functionalities.

19. The method of claim 18, said step of providing a non-pigmented jet ink composition, further including the provision of: between 0 to 1.5% by weight of the absolute mass of ink composition, a (G)penetrating agent comprising N-Methylpyrrolidone.

20. The method of claim 19, said step of providing a non-pigmented jet ink composition, further including the provision of: between 0.5 to 2.5% by weight of the absolute mass of ink composition, a (H)coloring agent selected from the group consisting of:
1) C.I. Acid Yellow 7—Sulfoflavine Acid Yellow;
2) C.I. Acid Yellow 73—Uranine Fluorescein;
3) C.I. Acid Red 44—Rose Bengal;
4) C.I. Solvent Red 49—Rhodamine B Base;
5) C.I. Acid Orange 7—Naphthalene Orange 7;
6) C.I. Acid Orange 52—Methyl Orange; and
7) C.I. Acid Blue 9—Acid Blue.

21. The method of claim 20, said step of providing a non-pigmented jet ink composition, further including the provision of: between 0.05 to 1.5% by weight of the absolute mass of ink composition, a (I)conductivity agent selected from the group consisting of:
1) Propionates of Sodium and Potassium;
2) Ammonium Thiocyanate;
3) Ammonium Acetate; and
4) Dimethyl Amine Hydrochloride.

22. A method for creating opaque indicia, comprising:
1) providing a substrate surface upon which the indicia will be applied;
2) providing a non-pigmented jet ink composition consisting of: by weight of said ink composition:
A) 3 to 10% of a film forming resin selected from the group consisting of:
1) nitrates of cellulose having a nitrogen content of between 11.8 and 12.2% by weight;
2) ethyl hydroxy ethyl cellulose; and
3) ethyl cellulose;
B) 0.5 to 2.5% of a modifying resin selected from the group consisting of:

1) Acrylics;
2) Styrene-Acrylic Co-polymers;
3) Alkyds; and
4) Polyvinyl Butyral-Resins;

C) 55 to 85% of a solvent blend consisting of: at least two solvents selected from the group consisting of:
1) ethanol;
2) methanol;
3) propanol;
4) butanol;
5) methyl ethyl ketone;
6) acetone;
7) ethyl acetate;
8) butyl acetate;
9) propylene glycol monomethyl ether;
10) ethylene glycol ethyl ether; and
11) ethylene glycol methyl ether;

3) applying said ink composition to the substrate in a desired arrangement to produce the selected indicia;

4) not moisturizing said ink composition on said substrate after application and prior to drying of same; and 5) drying said ink composition on said substrate to bond the same and create an indelible, abrasion resistant, climatically stable and opaque indicia on the substrate.

23. The method of claim 22, said step of providing a non-pigmented jet ink composition, further including the provision of: between 0.75 to 2.5 parts by weight of a (D)plasticizer selected from the group consisting of:
1) Butyl Benzyl Phthalate;
2) Diethyl Phthalate;
3) Dibutyl Phthalate;
4) Alkyl Benzyl Phthalate;
5) 2-Ethyl Hexyl Diphenyl Phosphate;
6) Isodecyl Diphenyl Phosphate; and
7) Triphenyl Phosphate;
for every 100 parts by weight of the total weight of the resins.

24. The method of claim 23, said step of providing a non-pigmented jet ink composition, further including the provision of: between 1 to 3% by weight of the absolute ink composition, a (E)coalescing agent selected from the group consisting of:

1) Dimethyl Aminoethanol;
2) Diethanolamine; and
3) Morpholine.

25. The method of claim 24, said step of providing a non-pigmented jet ink composition, further including the provision of: between 0.1 to 0.6% by weight of the absolute mass of the ink composition, an (F)adhesion promoter selected from the group consisting of Silicone compounds with:
1) epoxy methoxy;
2) methacrylate methoxy; and
3) vinyl benzyl-amine-methoxy
functionalities.

26. The method of claim 25, said step of providing a non-pigmented jet ink composition, further including the provision of: between 0 to 1.5% by weight of the absolute mass of ink composition, a (G)penetrating agent comprising N-Methylpyrrolidone.

27. The method of claim 26, said step of providing a non-pigmented jet ink composition, further including the provision of: between 0.5 to 2.5% by weight of the absolute mass of ink composition, a (H)coloring agent selected from the group consisting of:
1) C.I. Acid Yellow 7—Sulfoflavine Acid Yellow;
2) C.I. Acid Yellow 73—Uranine Fluorescein;
3) C.I. Acid Red 44—Rose Bengal;
4) C.I. Solvent Red 49—Rhodamine B Base;
5) C.I. Acid Orange 7—Naphthalene Orange 7;
6) C.I. Acid Orange 52—Methyl Orange; and
7) C.I. Acid Blue 9—Acid Blue.

28. The method of claim 27, said step of providing a non-pigmented jet ink composition, further including the provision of: between 0.05 to 1.5% by weight of the absolute mass of ink composition, a (I)conductivity agent selected from the group consisting of:
1) Propionates of Sodium and Potassium;
2) Ammonium Thiocyanate;
3) Ammonium Acetate; and
4) Dimethyl Amine Hydrochloride.

* * * * *